(12) United States Patent
Auriel et al.

(10) Patent No.: US 11,643,353 B2
(45) Date of Patent: May 9, 2023

(54) METHOD FOR AIR QUENCHING AN ELONGATED GLASS HOLLOW BODY COMPRISING AN AXIAL BORE

(71) Applicant: CROSSJECT, Dijon (FR)

(72) Inventors: Christophe Auriel, Binges (FR); Xavier Vigot, Veronnes (FR)

(73) Assignee: CROSSJECT, Dijon (FR)

( * ) Notice: Subject to any disclaimer, the term of this patent is extended or adjusted under 35 U.S.C. 154(b) by 0 days.

(21) Appl. No.: 16/461,117

(22) PCT Filed: Nov. 7, 2017

(86) PCT No.: PCT/FR2017/053036
§ 371 (c)(1),
(2) Date: May 15, 2019

(87) PCT Pub. No.: WO2018/091798
PCT Pub. Date: May 24, 2018

(65) Prior Publication Data
US 2020/0031705 A1 Jan. 30, 2020

(30) Foreign Application Priority Data
Nov. 15, 2016 (FR) ...................................... 1661064

(51) Int. Cl.
*C03B 27/06* (2006.01)
(52) U.S. Cl.
CPC ................. *C03B 27/062* (2013.01)
(58) Field of Classification Search
CPC ... C03B 27/06; C03B 27/062; C03B 27/0404; C03B 9/3808
See application file for complete search history.

(56) References Cited

U.S. PATENT DOCUMENTS

| | | | |
|---|---|---|---|
| 2,239,796 A * | 4/1941 | Stratton | ............... C03B 27/062 65/114 |
| 2,328,662 A * | 9/1943 | Meredith | .............. C03B 9/1932 65/307 |

(Continued)

FOREIGN PATENT DOCUMENTS

| | | | |
|---|---|---|---|
| EP | 0780343 A1 * | 6/1997 | ........... C03B 27/062 |
| FR | 2815544 | 4/2002 | |

(Continued)

OTHER PUBLICATIONS

Trávníček et al. Annular synthetic jet used for impinging flow mass-transfer. International Journal of Heat and Mass Transfer 46 (2003) 3291-3297. (Year: 2003).*

(Continued)

*Primary Examiner* — Erin Snelting
(74) *Attorney, Agent, or Firm* — Burris Law, PLLC

(57) ABSTRACT

A method for air quenching a glass hollow body elongated along a main axis, including a wall having an external surface, and an internal surface formed by a bore extending in height along the main axis, is provided. The method includes simultaneously blasting air jets towards the surfaces of the glass hollow body using air blast nozzles directed towards the surfaces. External nozzles distribute air jets over the external surface of the glass hollow body and a nozzle above the bore of the glass hollow body and aligned along the main axis distributes an internal air jet over the internal surface of the glass hollow body. In a transverse plane to the main axis the internal air jet is in the form of a crown having a recess at the center.

6 Claims, 3 Drawing Sheets

(56) References Cited

U.S. PATENT DOCUMENTS

| | | | | |
|---|---|---|---|---|
| 2,375,944 A | * | 5/1945 | Quentin | C03B 27/062 65/115 |
| 3,155,481 A | * | 11/1964 | Boyce | C03B 27/06 65/104 |
| 3,173,273 A | | 3/1965 | Fulton | |
| 3,208,229 A | | 9/1965 | Fulton | |
| 3,608,766 A | * | 9/1971 | D'Orefice | C03B 27/065 215/374 |
| 4,735,645 A | * | 4/1988 | Wasylyk | C03B 27/062 65/114 |
| 4,749,401 A | * | 6/1988 | Colmon | C03B 27/0404 65/104 |
| 7,487,650 B2 | * | 2/2009 | Hyre | C03B 9/3681 65/261 |
| 2003/0000227 A1 | | 1/2003 | Schenk et al. | |
| 2006/0016220 A1 | | 1/2006 | Spaeth et al. | |
| 2010/0076375 A1 | | 3/2010 | Alexandre | |

FOREIGN PATENT DOCUMENTS

| | | |
|---|---|---|
| JP | H10509613 | 9/1998 |
| JP | 2002531227 | 9/2002 |
| JP | 2007044529 | 2/2007 |
| JP | 2010503504 | 2/2010 |
| JP | 2013530119 | 7/2013 |

OTHER PUBLICATIONS

International Search Report for International Application PCT/FR2017/053036, dated Feb. 27, 2018.

* cited by examiner

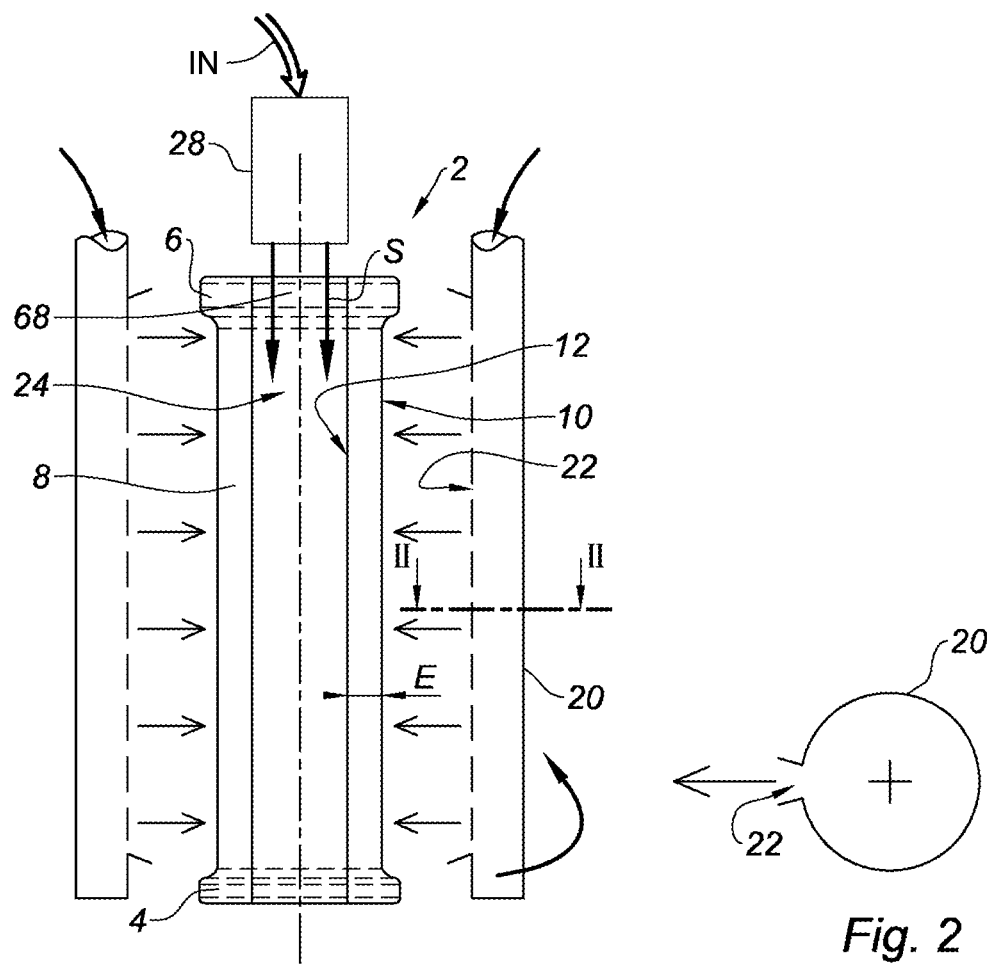
*Fig. 1*
*Fig. 2*
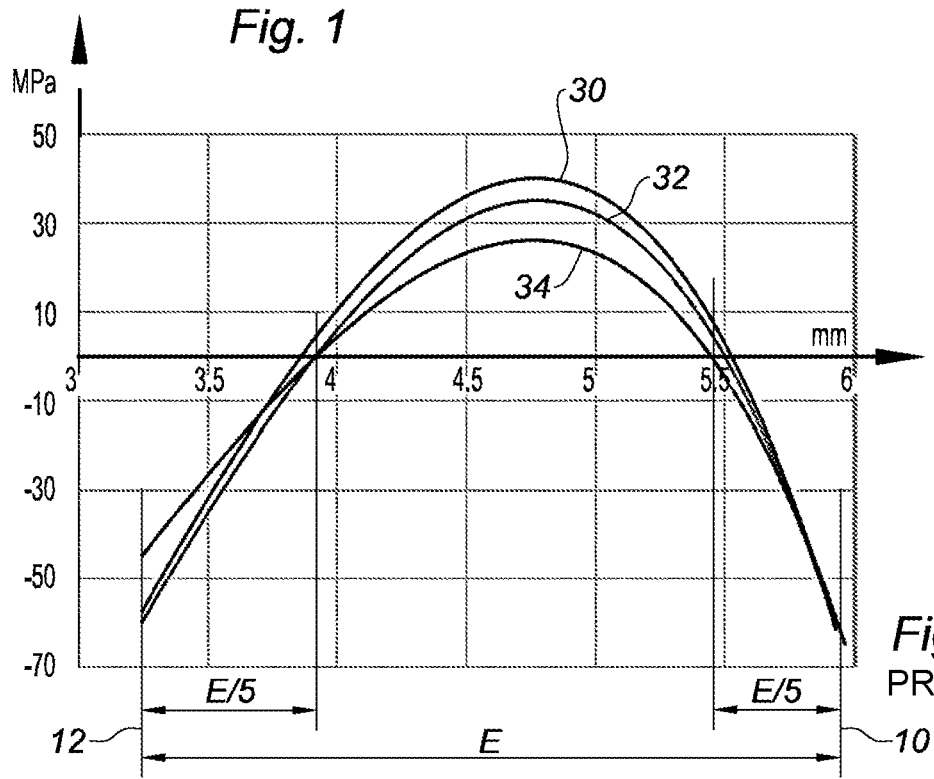
*Fig. 3*
PRIOR ART

METHOD FOR AIR QUENCHING AN ELONGATED GLASS HOLLOW BODY COMPRISING AN AXIAL BORE

CROSS-REFERENCE TO RELATED APPLICATIONS

This application is a 371 National Phase Application of International Application No. PCT/FR2017/053036, filed on Nov. 7, 2017, which claims priority to and the benefit of FR 16/61064, filed on Nov. 15, 2016. The disclosures of the above applications are incorporated herein by reference.

FIELD

The present disclosure relates to a method for air quenching a glass hollow body, as well as a quenching installation implementing such a quenching method, and a device for injection under the skin containing such a hollow body.

BACKGROUND

The statements in this section merely provide background information related to the present disclosure and may not constitute prior art.

One type of known injection device, presented in particular by the document FR-A1-2815544, is provided for carrying out intradermal, subcutaneous or intramuscular needleless injections of active ingredients contained in a fluid for therapeutic use in human medicine or veterinary medicine. The fluid may be a gel or a more or less viscous liquid.

These single-use devices contain a source of energy such as a pressurized gas generator, delivering a gas suddenly released on a plunger fitted into a cylinder formed by a glass tube, to propel the fluid contained below this plunger towards an injection nozzle in contact with the skin, and inject it under this skin.

The glass tube must have accurate dimensions in order to achieve sealing at the ends, and around the plunger sliding therein. In addition, this tube must have a high mechanical strength to withstand the shock coming from the sudden pressure established inside by the pressurized gas.

To obtain a high mechanical strength of a glass tube having a main axis, a known air quenching method, presented in particular by the document US-A1-20060016220, uses a quenching installation carrying out a cooling by air blasting, including eight columns distributed around the tube parallel to this tube, each comprising a series of discrete nozzles extending over the height of this tube, and directed radially towards the axis, and an axial nozzle coming above the bore of the tube.

After having heated the tube to a the required temperature, all nozzles are suddenly supplied with pressurized air to cool at the same time the outside by the radial nozzles, and the inside by the axial jet coming from above the bore of the tube.

A sudden cooling forming a quenching of the surface layers of the two surfaces of the wall of the tube, inside and outside this tube, and a slower cooling of the material between the two skin layers of this tube are obtained. Then there is a pressure prestressing on the skin layers, and a prestressing tension in the inside material between these layers, which confers a high strength to the tube thus treated.

Nonetheless, this method results in uneven distribution of the cooling rate on the internal surfaces of the wall of the tube, which confers to this tube a variable strength along the height of the bore.

SUMMARY

In one form of the present disclosure, a method for air quenching a glass hollow body elongated along a main axis is provided, including a wall having an external surface, and an internal surface formed by a bore extending in a height direction along the main axis, this method using air blast nozzles directed towards the surfaces, being remarkable in that it simultaneously blasts air jets by external nozzles distributed over the external surface, and above the bore in the axis an internal air jet forming in a transverse plane a crown having a recess at the center. For example, in some aspects of the present disclosure, the method comprises simultaneously blasting and distributing air jets over the external surface and the internal surface of the glass hollow body. An internal air jet is distributed over the internal surface, aligned along the main axis and in a transverse plane to the main axis is in the form of a crown with a recess at the center.

An advantage of this quenching method is that in addition to the air jets over the entirety of the external surface, the blast inside the bore of the hollow air jet disposed along the axis, directly directs the air of this jet on the internal walls to cool them as quickly as possible, without unnecessary loss of air flow rate in the center that would cross the bore by emerging from the other side without contributing to cool the walls.

A better evacuation of the hot air, and with the same flow rate, a maximum efficiency on the inner wall of the tube, are obtained giving a more uniform cooling over the entire height of the glass hollow body.

In addition, the quenching method according to the present disclosure may include one or more of the following features, which may be combined with each other.

Advantageously, the quenching method blasts air through an axial nozzle opening above the bore.

In this case, advantageously the method blasts air through an axial nozzle comprising a shape that opens forming a crown.

Advantageously, the method blasts air through external nozzles having an axial slot. A better distribution of fresh air can also be obtained over the external and internal surfaces.

Advantageously, all the external nozzles have an axial slot which extends substantially over the entire height of the external surface to be treated.

Advantageously, during quenching, the method rotates the air jet relative to the hollow body about the main axis. The cooling on the contour of the internal and external surfaces is regulated.

In another form of the present disclosure, an installation for quenching a glass hollow body includes nozzles for blasting air on this body. Particularly, a plurality of external nozzles are positioned around a main axis of the installation and each of the plurality of external nozzles comprise an axial slot configured to direct an air jet towards the main axis. In some aspects of the present disclosure, the plurality of external nozzles rotate about the main axis during blasting of air jets directed to the main axis. An axial nozzle is aligned along the main axis and comprises a shape configured to form an internal air jet a shape in a transverse plane to the main axis of a crown with a recess at a center of the crown.

Advantageously, the installation includes an axial nozzle having a shape which opens comprising an axial core connected by radii to an external contour.

In some aspects of the present disclosure, the method and the installation provide a reservoir for containing fluid. In such aspects, the reservoir is part of a needleless injection device for carrying out intradermal, subcutaneous or intramuscular injections of active ingredients contained in a fluid for therapeutic use. The reservoir is formed from a glass tube constituting a hollow body made using the method and installation according to the teachings of the present disclosure.

In some aspects of the present disclosure, the reservoir may contain a fluid having at least one active ingredient selected from the group comprising the following treatment active ingredients:

Methotrexate,
Adrenaline,
Sumatriptan,
Hydrocortisone,
Naloxone,
Midazolam,
Apomorphine,
Methylnaltrexone bromide,
Phytomenadione,
Chlorpromazine hydrochloride,
Zuclopenthixol acetate,
Danaparoid sodium,
Enoxaparin sodium,
Estradiol cypionate,
Medroxyprogesterone acetate,
Medroparine calcium,
Methylprednisolone acetate,
Heparin calcium, and
Terbutaline.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is an axial sectional view of an installation for quenching a glass tube, implementing a quenching method according to the teachings of the present disclosure;

FIG. 2 is a cross-sectional view along the section plane II-II of an air blasting external cylinder of this installation;

FIG. 3 is a graph showing residual stress measurements in the wall of this glass tube, with a quenching method according to the prior art;

Figure 4:
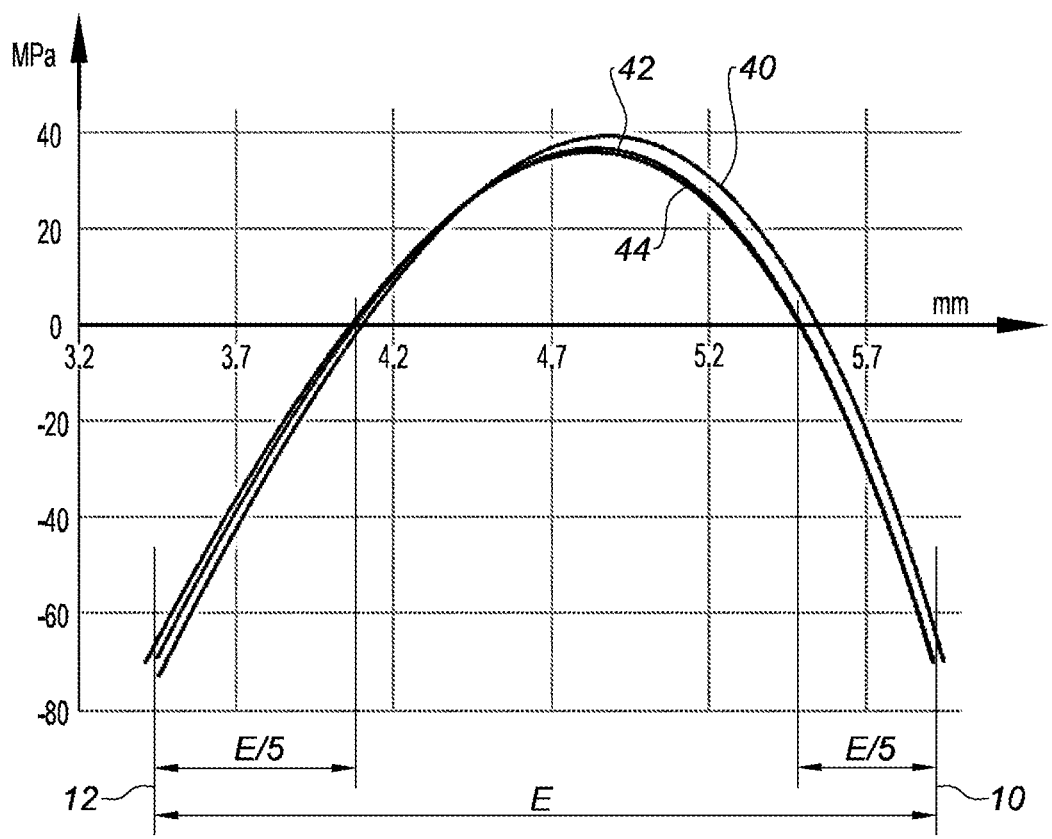
FIG. 4 is a similar graph as shown in FIG. 3 for a quenching method according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a glass tube 2 (also referred to herein simply as a "tube") of revolution about an axis shown vertically, including a tubular cylindrical portion 8 comprising a wall of constant thickness E, terminating at the bottom in a lower bead 4, and at the top in an upper bead 6 having a more height (vertical direction in the figures) than the lower bead 4.

In FIG. 1 an axis (dotted line) is shown vertically with the upper portion of the tube 2 being conventionally called the top, however the tube 2 may lie in any orientation during a quenching method according to the teachings of the present disclosure.

The tube 2 has an axial bore comprising a constant circular section along the entire height, leaving on the cylindrical portion 8 a wall including a relatively important thickness E of several millimeters, which in some aspects of the present disclosure is substantially equal to the radius of the bore.

The lower bead 4 and upper bead 6 confer significant rigidity to the ends of the tube 2, and form planar transverse end surfaces receiving a seal. In some aspects of the present disclosure, the tube 2 has a total height of about 30 mm, however tube with a total height less than 30 mm or greater than 30 mm are included within the teachings of the present disclosure.

The glass tube 2 is part of an injection device presented in particular by the above-mentioned document of the prior art, receiving in its axial bore a plunger subjected on the upper side to a sudden discharge of a pressurized gas, in order to inject under the skin a fluid located in the lower portion.

The sudden shock of the gas pressure pressurizes the fluid. The wall of the cylindrical portion 8 of the tube 2 must withstand the pressure shock coming from the gas and transmitted to the fluid.

FIG. 3 represents, for a quenching method shown in particular by the above-mentioned document of the prior art, as a function of the position in the thickness of the wall of the cylindrical portion 8 of the tube 2, represented by the radius relative to the axis of this tube expressed in millimeters, a measurement of the residual stress in this wall performed by photoelasticimetry at different heights of this cylindrical portion.

The residual stress expressed in MPa, includes a first curve 30 of measurements performed on the upper 5 mm of the cylindrical portion 8 of the tube 2, a second curve 32 of measurements performed on the median 5 mm, and a third curve 34 of measurements performed on the lower 5 mm of this cylindrical portion.

Photoelasticimetry allows visualizing the existing stresses in the material inside the walls thanks to their photoelasticity, by using the refringence of an optical radiation crossing this material subjected to stresses. The polarization of the transformed light is studied after passing throughout the material.

For the three curves 30, 32, 34 measured on the cylindrical portion 8 at three different heights, the application of compressive stresses corresponding to negative stresses for thicknesses starting from the internal 12 and external 10 surfaces, which are in the range of ⅕ of the thickness E of the wall of the tube, is observed.

Nonetheless, it is noticed that the negative stresses applied on the inner wall of the tube have a high inequality along the height in the tube 2, which results in a highly variable strength of this tube.

Referring back to FIGS. 1 and 2, around the tube 2 a series of external cylinders 20 are disposed parallel to this tube, regularly distributed around this tube, each having an external nozzle 22 turned towards the axis, forming a continuous slot disposed opposite the height to be treated of this tube.

An axial nozzle 28 disposed along the axis above the bore of the tube 2, delivers in this bore an air flow rate forming in a transverse plane a crown, having at the center a recess 68 where the flow rate is absent.

The external cylinders 20 as well as the axial nozzle 28 are supplied at the upper end by a considerable fresh air flow rate.

The installation includes a motorization of the external cylinders 20, which drives these cylinders and therefore the jets of air blasted in rapid rotation along the axis during the air quenching.

In this way, both a good axial distribution of the air flow to the outside through the continuous slots of the external nozzles 22, as well as a good angular distribution through the rotation of the cylinders 20 allowing the flow of air in an equivalent manner over the entire contour of the external surface 10 are obtained.

An improved air flow rate inside the bore is also obtained, the air jet with the internal recess 68 forming a crown which concentrates this air on the internal surface 12. With an equivalent air flow rate, it is possible to obtain better cooling of this internal surface 12 over the entire height.

FIG. 4 shows for the quenching method according to the present disclosure, as a function of the thickness E of the wall of the cylindrical portion 8 of the tube 2, the residual stress inside this wall.

There are a first curve 40 of measurements performed on the upper 5 mm of the cylindrical portion 8 of the tube 2, a second curve 42 of measurements performed on the 5 mm of the median transverse plane, and a third curve 44 of measurements performed on the lower 5 mm of this cylindrical portion.

For the three curves 40, 42, 44 measured on the cylindrical portion 8 at three different heights, the application of compressive stresses corresponding to negative stresses, on thicknesses starting from the internal 12 and external 10 surfaces, are in the range of ⅕ of the thickness E of the wall of the tube, is also observed.

Nonetheless, it can be observed that the negative stresses applied on the inner wall of the tube have a good equality along the height in the tube 2, which confers a very constant strength to this tube.

Hence, a high homogeneity of the strength of the entire tube 2, which is close to the maximum strength obtained with the method according to the prior art, is obtained.

Figure 5:
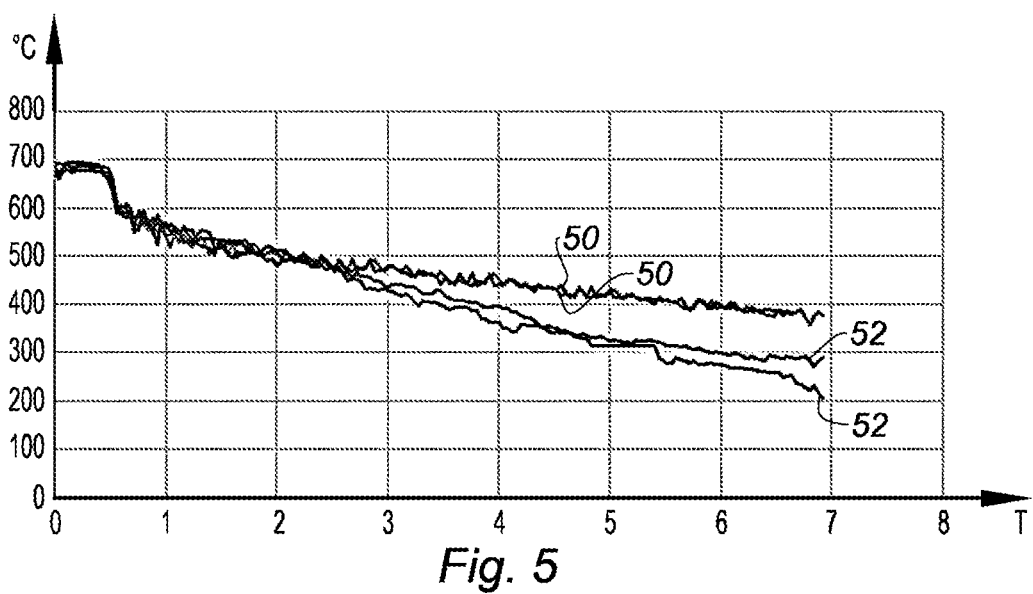
FIG. 5 is a graph showing cooling curves of a glass tube for the two quenching methods shown hereinabove.

FIG. 5 shows as a function of time T expressed in seconds on the horizontal axis, the maximum temperature measured on the tube during the cooling phase, expressed in ° C.

Two first curves 50 represent the maximum temperature for a method according to the prior art shown hereinabove, and two second curves 52 represent the temperature for a method according to the present disclosure.

For all the curves 50, 52, an equivalent decrease of the temperature is observed up to the time equal to 2.5 s, with a temperature reached of about 480° C. Then a faster decrease of the temperature is observed for the two second curves 52, which reaches after 6 s a temperature little lower than 300° C., while the temperature of the first curves 50 is still at 400° C.

With the following method according to the present disclosure, a faster temperature drop is obtained, as well as a better distribution of this temperature drop, which confers the best strength qualities to the tube 2.

Figure 6:
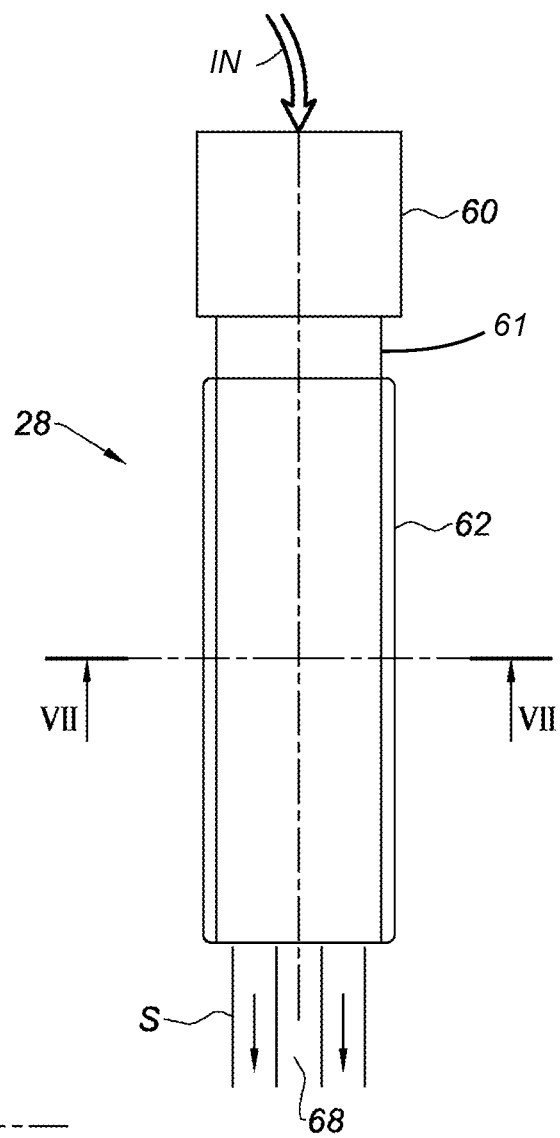
FIG. 6 shows a front view of an axial nozzle of a quenching installation according to the teachings of the present disclosure.
Figure 7:
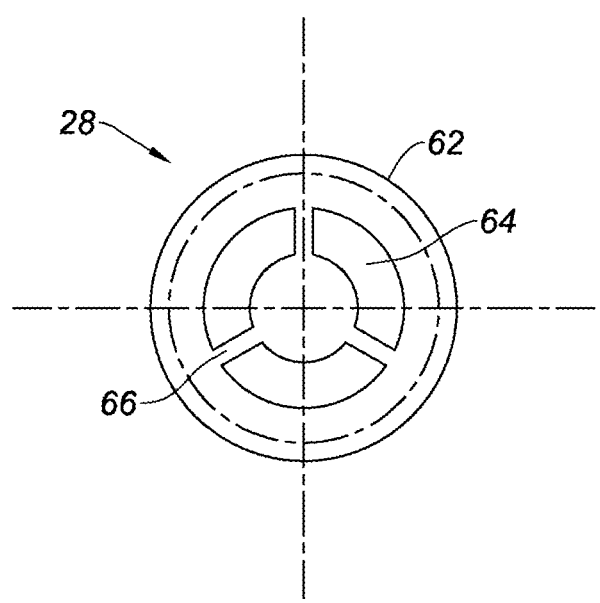
FIG. 7 shows a cross-sectional view along the section plane VII-VII for the axial nozzle in FIG. 6.

FIGS. 6 and 7 show an axial nozzle 28 comprising an inlet IN and an outlet S, including in the lower portion an external tapping 62 provided to screw a support, the upper head 60 forming an impression to provide a key 61 for clamping on this support.

The lower portion of the axial nozzle 28 includes a shape opening downwards, comprising an axial core connected by three radii 66 of small thickness to the external contour. In this way, three air passages forming circular arcs 64 are disposed, which deliver the air jet constituting a crown comprising the central recess 68.

With the method according to the present disclosure, it is possible to carry out an air quenching on an elongated hollow body having different shapes, comprising an axial bore.

The method is particularly suitable for a tube of a device for injection under the skin, forming a reservoir containing a fluid including at least one active ingredient selected from the group comprising the following treatment active ingredients:

Methotrexate,
Adrenaline,
Sumatriptan,
Hydrocortisone,
Naloxone,
Midazolam,
Apomorphine,
Methylnaltrexone bromide,
Phytomenadione,
Chlorpromazine hydrochloride,
Zuclopenthixol acetate,
Danaparoid sodium,
Enoxaparin sodium,
Estradiol cypionate,
Medroxyprogesterone acetate,
Medroparine calcium,
Methylprednisolone acetate,
Heparin calcium,
Terbutaline.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

The invention claimed is:

1. A method for air quenching a glass hollow body elongated along a main axis, including a wall having an external surface and an internal surface formed by a bore extending along the main axis, the method comprising:
   simultaneously blasting and distributing air jets over the external surface and the internal surface of the glass hollow body, wherein an internal air jet distributed over the internal surface is aligned along the main axis,
   wherein an axial nozzle blasting the internal air jet is positioned substantially external to and above the bore, wherein a portion of the axial nozzle includes a solid axial core and an external wall cooperating with each other to define circular arc shaped passages therebetween, the internal air jet flowing through the circular arc shaped passages forms a ring with an opening at a center thereof in a plane transverse to the main axis.

2. The quenching method according to claim 1, wherein the internal air jet is blasted through an axial nozzle opening above the bore.

3. The quenching method according to claim 2, wherein the axial nozzle comprises radii connecting the solid axial core to the external wall.

4. The quenching method according to claim 1 further comprising external nozzles blasting and distributing air jets over the external surface of the glass hollow body.

5. The quenching method according to claim 4, wherein the external nozzles extend substantially over an entire height of the external surface of the glass hollow body.

6. The quenching method according to claim 4, further comprising rotating the external nozzles about the main axis during blasting and distributing the air jets over the external surface.

* * * * *